(12) United States Patent
Wimer et al.

(10) Patent No.: US 6,843,187 B2
(45) Date of Patent: Jan. 18, 2005

(54) METHOD AND DEVICE FOR CAPPING SEEDLING BUDS

(75) Inventors: Roger Dale Wimer, Kelso, WA (US); David N. Stearns, Silverton, OR (US)

(73) Assignee: IF A Nurseries, Inc., Camby, OR (US)

( * ) Notice: Subject to any disclaimer, the term of this patent is extended or adjusted under 35 U.S.C. 154(b) by 0 days.

(21) Appl. No.: 10/336,536

(22) Filed: Jan. 3, 2003

(65) Prior Publication Data

US 2003/0177693 A1 Sep. 25, 2003

Related U.S. Application Data

(60) Provisional application No. 60/345,209, filed on Jan. 3, 2002, and provisional application No. 60/357,587, filed on Feb. 15, 2002.

(51) Int. Cl.$^7$ ................................................. A01C 1/00
(52) U.S. Cl. ..................................................... 111/200
(58) Field of Search ............................... 111/200, 915, 111/919; 47/20.1, 23.1, 23.2, 24.1, 29.1–29.7, 31, 31.1, 56

(56) References Cited

U.S. PATENT DOCUMENTS

| | | | | |
|---|---|---|---|---|
| 4,769,264 A | * | 9/1988 | Dreger | 428/40.2 |
| 5,720,155 A | * | 2/1998 | Weder | 53/397 |

* cited by examiner

Primary Examiner—Christopher J. Novosad

(57) ABSTRACT

The novel seedling bud capping device is easily deployed on a bud of a seedling due to the use of adherent on either edge (rather than a staple), and more particularly due to its predefinedly selective use of adherent to form an inverted conic space around the bud for receiving sunlight and for capturing the bud stem near its base. The paper stock or the adherent used in the bud capping device may be impregnated with a repellent scent to further ward away browsers to protect the seedling. Preferably, the bud capping device is made from a small, e.g. ~5 inch, square piece of water-repellent paper stock having a layer of glue adjacent at least one edge. The stock is protected on the adherent side by another layer of material to be selectively removed. This protective layer is scored and a free segment of the protective backing layer is removed to expose a region of adherent. Because the adherent is wider at the base than at the top, when the device is deployed near a terminus of a seedling bud, it grasps the base of the bud's stem at a fulcrum of an inverted cone while leaving open the top of the device for exposure to sunlight. The bud capping device prevents browsing of a fragile seedling while permitting the seedling to thrive. The bud capping device may be affixed with a pull-tab scent device of any suitable configuration, preferably with a slow-release animal repellent. The device may be arranged and mass-produced in laminar sheets, cut and formed into rolls for easy dispensing.

12 Claims, 7 Drawing Sheets

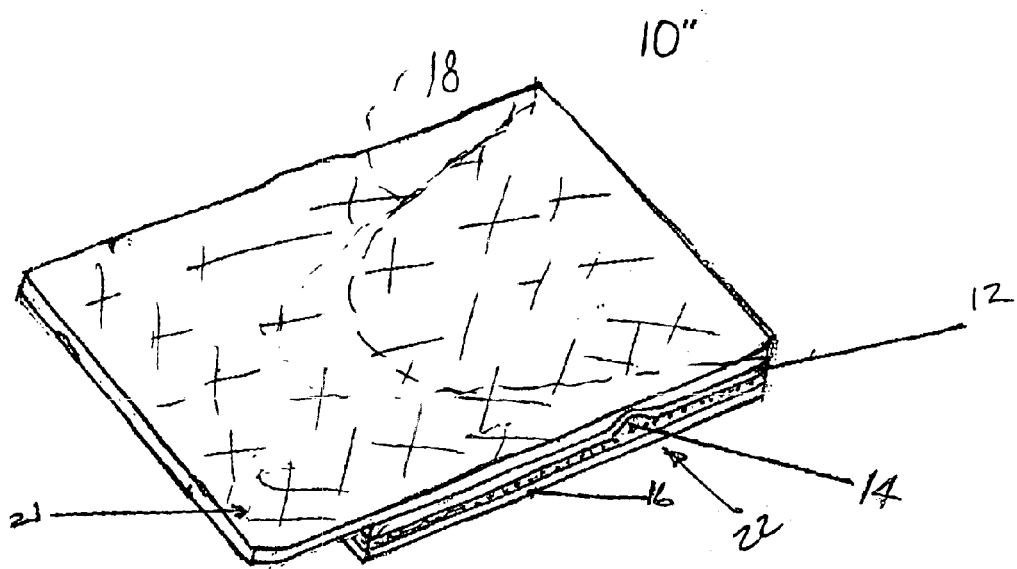
FIG. 7
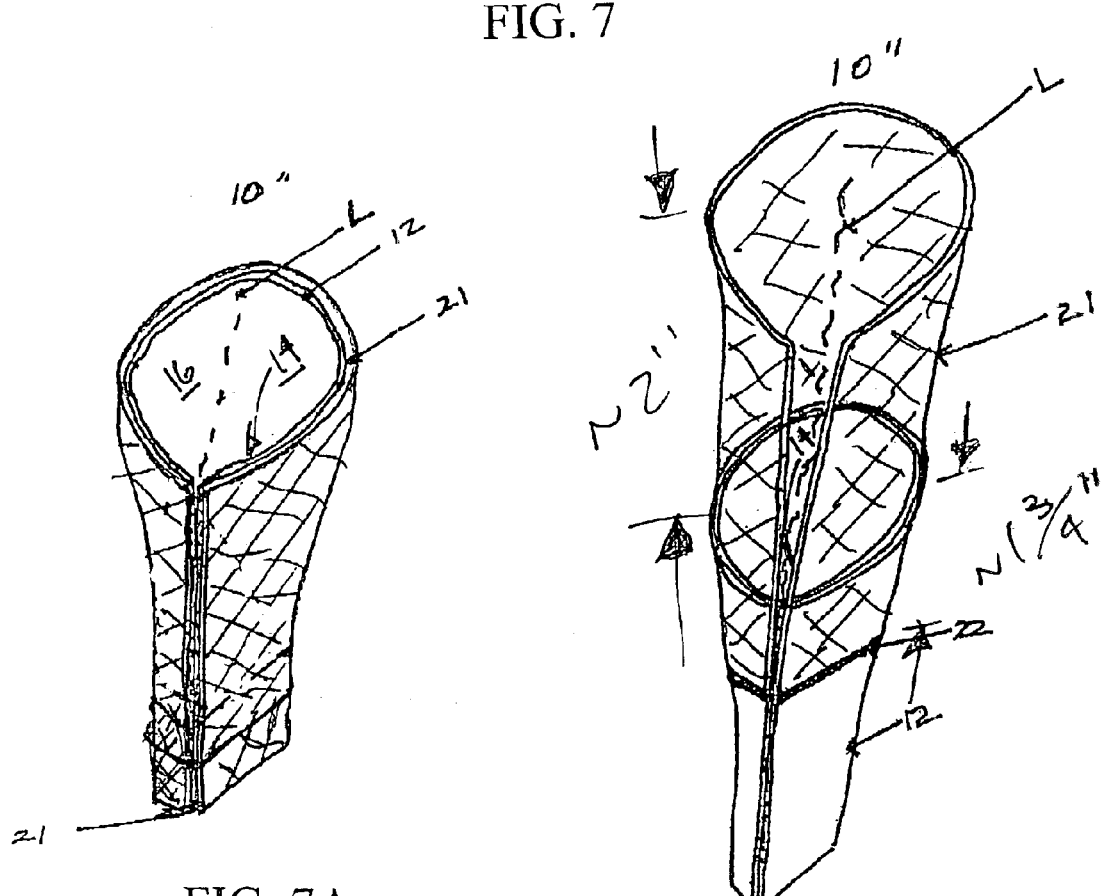
FIG. 7A
FIG. 7B

METHOD AND DEVICE FOR CAPPING SEEDLING BUDS

This application claims priority from U.S. Provisional Application Ser. No. 60/345,209, filed Jan. 3, 2002 and U.S. Provisional Application Ser. No. 60/357,587, filed Feb. 15, 2002.

BACKGROUND OF THE INVENTION

Seedling buds are typically started in nurseries where they are protected against the elements including animal browsing. However, when the seedlings are transplanted to an outdoor reforestation site or tree farm, they become vulnerable to animal browsing. Browsing damage by vertebrates can affect the growth rate and form of seedlings. If the growth rate is reduced, the time to yield or the yield itself is reduced. If browsing of the apical bud occurs then double leaders are the result, which lowers the quality and form of the final product. Control of browsing is essential to avoid partial or even complete loss of planting stock, and economic failure of a plantation. Seedlings can be protected through a range of lethal and non-lethal methods. When native animals are implicated in causing damage, non-lethal methods should be considered first. Hunting and poisoning are lethal methods of controlling browsing, but require sustained effort, can damage ecosystem balance, and can lead to secondary deaths. Trapping is a non-lethal control but requires permits and is disruptive to the animal and likely leads to animal death. Various fencing methods are effective but are costly.

Alternatively, bud capping has been found to discourage browsing, as has the use of repellents that may be sprayed on the seedlings. Known bud capping devices require the use of a staple to hold opposite edges of a piece of paper stock together, forming a cylindrical tube around the terminus of a seedling bud. Unfortunately, such crude prior art devices require a forester or nursery staff member to carry around a bulky and difficult-to-use stapler. Worse, the stapling operation is typically performed by wrapping the seedling terminus with the paper stock and then stapling the edges together. Often the staple penetrates the seedling's stem, thereby damaging the seedling. Always, the staple penetrates the paper stock, thereby diminishing its water-repellent capability. None of the known prior art incorporates repellent or scenting into a bud cap as a form of double browse prevention.

SUMMARY OF THE INVENTION

The novel seedling bud capping device is easily deployed on a bud of a seedling due to the use of adherent on either edge (rather than a staple), and more particularly due to its predefined selective use of adherent to form an inverted conic space around the bud for receiving sunlight and for capturing the bud stem near its base. The paper stock or the adherent used in the bud capping device may be impregnated with a repellent scent to further ward away browsers to protect the seedling. Preferably, the bud capping device is made from a small, e.g. ~5 inch, approximately square piece of water-repellent paper stock having a layer of glue adjacent at least one edge. The stock is protected on the adherent side by another layer of material to be selectively removed. In accordance with a first embodiment of the invention, this protective layer is scored diagonally and a free trapezoidal segment of the protective backing layer is removed to expose a trapezoidal region of adherent. In accordance with a second embodiment of the invention, the protective layer is scored along a V-shaped line and a free, bottom segment of the protective backing layer is removed to expose a V-shaped region of adherent.

Because the adherent is wider in both embodiments at the base than at the top, when the device is deployed near a terminus of a seedling bud, it grasps the base of the bud's stem at a fulcrum of an inverted cone while leaving open the top of the device for exposure to sunlight. The bud capping device prevents browsing of a fragile seedling while permitting the seedling to thrive. The bud capping device may also be scented, preferably with a time-release animal repellent, to further discourage browsing.

BRIEF DESCRIPTION OF THE DRAWINGS

FIG. 7 is an isometric view of a bud capping device manufactured in accordance with a third embodiment of the invention.

FIG. 7A is an isometric view of the bud capping device of FIG. 7 in a first use configuration.

FIG. 7B is an isometric view of the bud capping device of FIG. 7 in a second use configuration.

DETAILED DESCRIPTION

Figure 1:
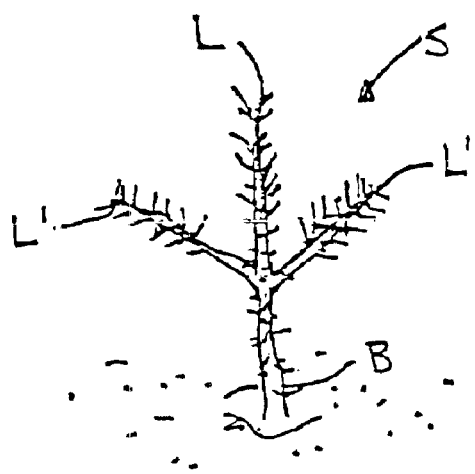
FIG. 1 shows a seedling bud.

FIG. 1 shows a bud seedling S in need of protection from animal browsing. Seedling S may be seen to have a base B that is planted in the ground, an apical bud, or leader, L and one or more laterals L'. Typically, seedling S is transplanted from a nursery to a reforestation site or tree farm when it is between approximately 1.0 and 3.0 feet tall. Those of skill in the art will appreciate that seedling S attracts animals, such as rabbits or deer, and that browsing of the fragile plant may damage or destroy it. It is estimated that animal browsing often damages up to a third or more of the seedlings in a reforestation area.

Figure 2:
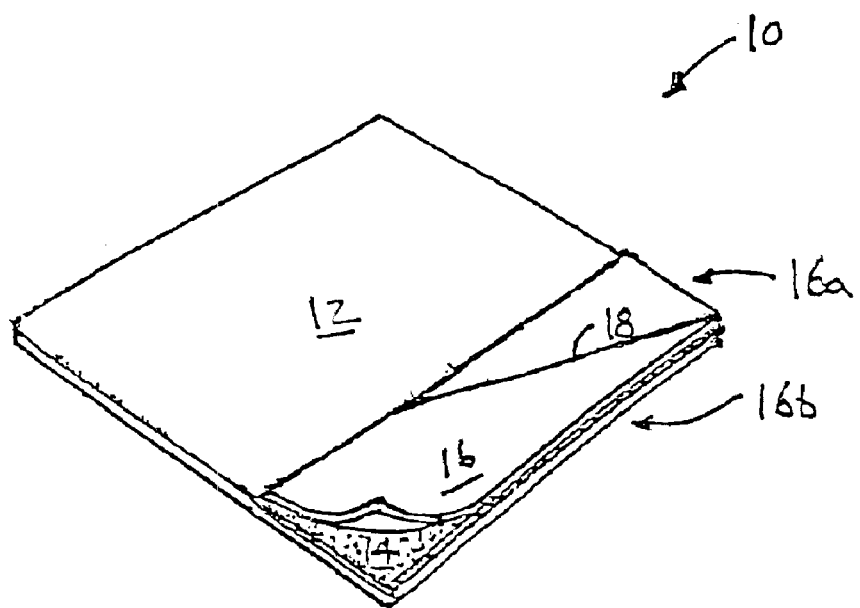
FIG. 2 is an isometric view of the invented bud capping device in accordance with a first embodiment of the invention.

FIG. 2 shows a bud capping device 10 in accordance with a first embodiment of the invention. Device 10 may be any suitable size, which size may vary depending upon the type of tree seedling. In one embodiment of the invention, device 10 is made of water-repellent paper stock that is approximately square. Such paper stock is available, for example, under the brand name Rite-In-The-Rain™, which is available from J. L. Darling Corporation of Tacoma, Wash. Illustrated device 10 is 5 inches wide and 5½ inches high. The paper stock may be white or any other suitable color, and may have printed thereon a company logo or other trademark.

Device 10 preferably includes a substrate 12, e.g. water-repellent paper stock. An adherent strip 14 (indicated by stippling, for clarity) is affixed on one side of substrate 12, as shown in FIG. 2, and a protective cover layer 16 is temporarily adhered over the of adhesive strip 14. Next, a score is made substantially through cover layer 16 along a diagonal score line 18, separating cover layer 16 into two sections, a triangular section 16a and a trapezoidal section 16b. Device 10 prior to deployment thus may be handled and stored without damage to adherent strip 14 or to substrate 12. When device 10 is deployed, trapezoidal section 16b is removed by simply peeling it away (as suggested in FIG. 2) from substrate 12 to expose a trapezoidal adherent surface of device 10.

Figure 3:
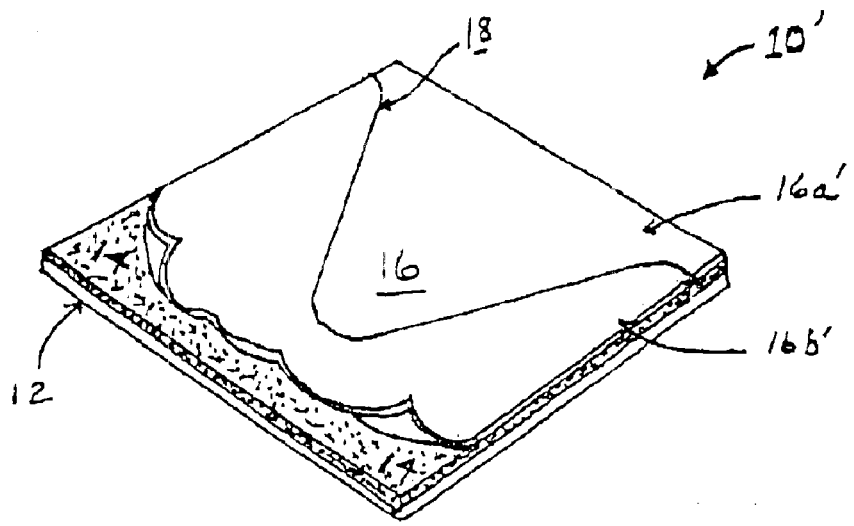
FIG. 3 is an isometric view of the invented bud capping device in accordance with a second embodiment of the invention.

FIG. 3 shows a second embodiment of the invention. In accordance with this second embodiment, a bud-capping device 10' is similar in most respects to bud-capping device 10, but for the shape of the exposed adherent surface 14. As may be seen, a score line 18' is generally V-shaped, with rounded top and bottom corners. A generally V-shaped segment 16b' of cover layer 16 is removed, as indicated, to expose a generally V-shaped region of adherent strip 14. The upper generally V-shaped segment 16a' of cover layer 16 remains intact, and promotes the upside-down conic shape of device 10' when the two opposing lateral sides are pinched together and adhered along the adherent-exposed base and sides. Preferably, the lower rounded notch of the V is located approximately 1.5 inches from the bottom and the upper rounded corners of the V are located approximately 0.25 inch from the top of device 10'. The radius of the rounded corners is preferably approximately 0.125 inch.

Figure 3A:
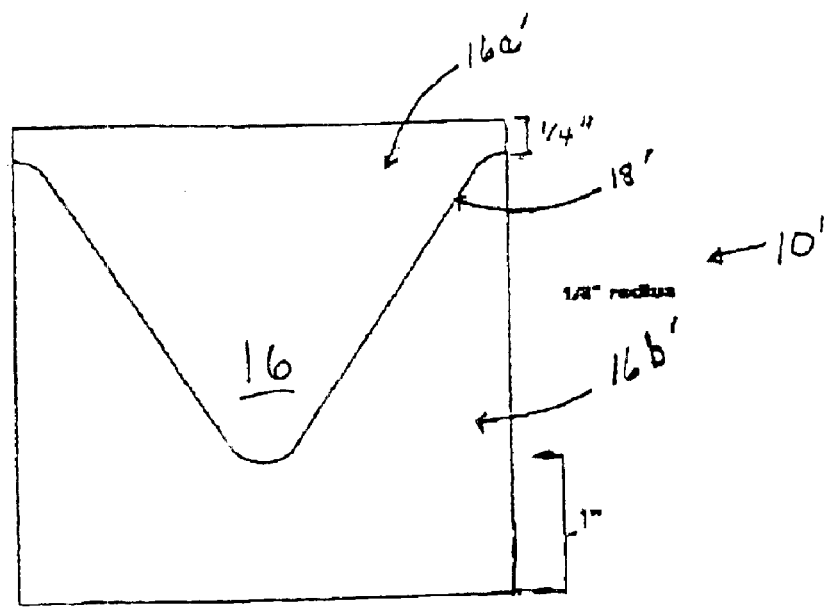
FIG. 3A is a top plan view of the second embodiment shown in FIG. 3.

FIG. 3A is a top plan view of device 10' with the protective layer 16 scored along score line 18' to divide it into two sections 16a', 16b'. The dimensions described above are illustrated in FIG. 3A.

Figure 4:
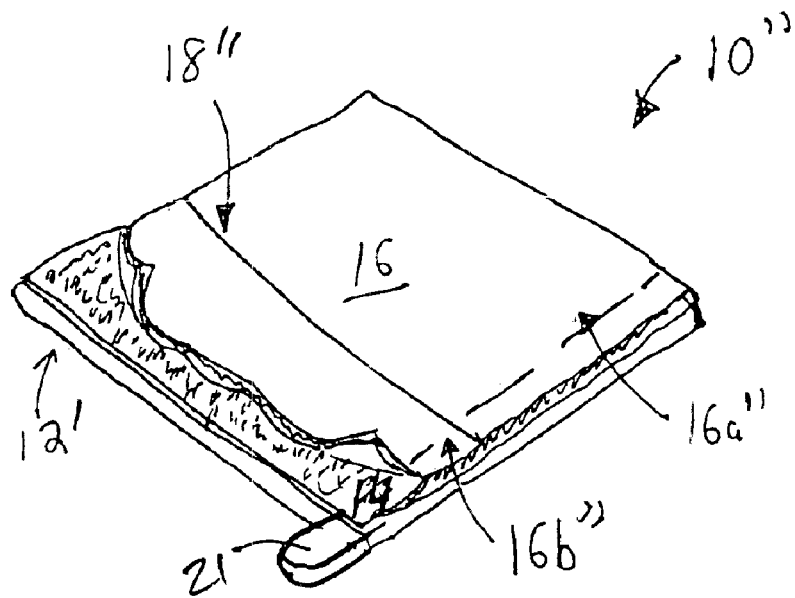
FIG. 4 is an isometric view of the invented bud capping device in accordance with a third embodiment of the invention.

FIG. 4 shows a third embodiment of the invention. In accordance with this third embodiment, a bud-capping device 10" is similar in most respects to bud-capping device 10, but for the shape of the exposed adherent surface 14. As may be seen, a score line 18" is generally parallel to the substrate edge. A rectangular-shaped segment 16b" of cover layer 16 is removed, as indicated, to expose a rectangular region of adherent strip 14. The upper rectangular shaped segment 16a" of cover layer 16 remains intact, and promotes the upside-down conic shape of device 10" when the two opposing lateral sides are pinched together and adhered along the adherent-exposed base and sides. It also leaves exposed adherent surface to the elements. Preferably, the lower rectangular region is approximately 1.5 inches high, i.e. score line 18 is located approximately 1.5 inches from the bottom of device 10". Device 10" preferably includes a pull tab 21 for exposing a scented region of substrate 12'.

Figure 4A:
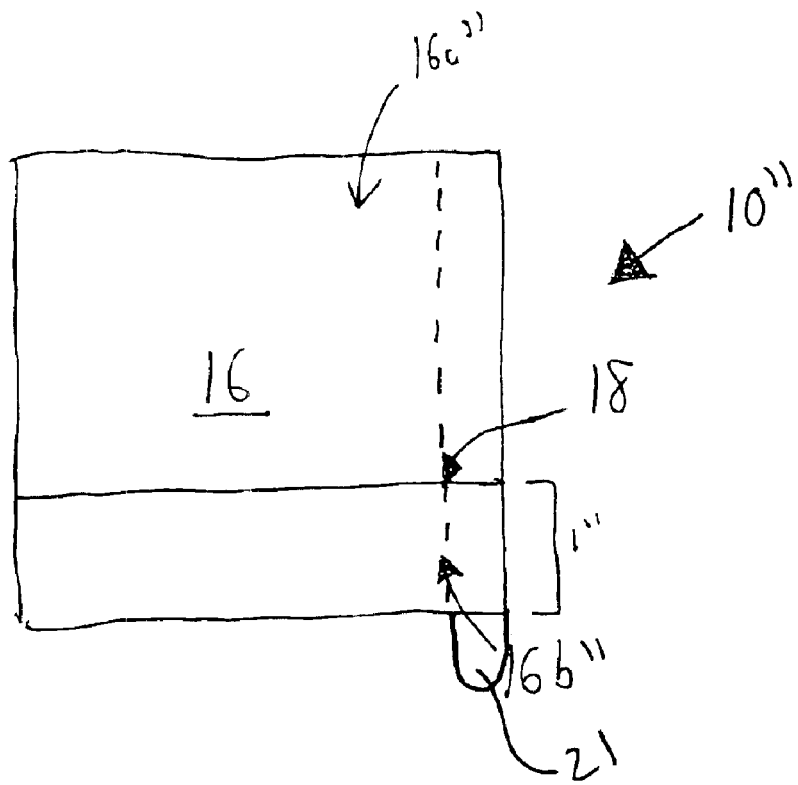
FIG. 4A is a top plan view of the third embodiment shown in FIG. 4.

FIG. 4A is a top plan view of device 10' with a protective layer 16 scored along score line 18" to divide it into sections 16a", 16b". The dimensions described above are illustrated in FIG. 2A.

Figure 5:
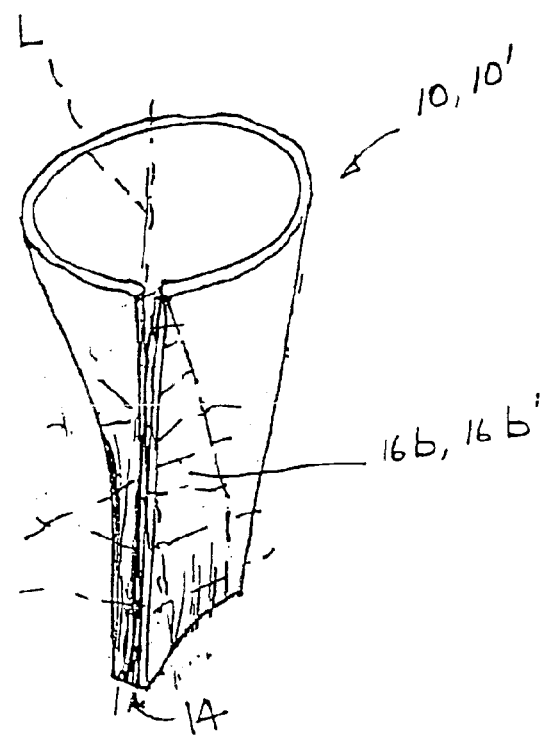
FIG. 5 shows a seedling bud with the invented bud capping device (first or second embodiment) affixed thereto.

FIG. 5 shows bud capping device 10 or 10' around the terminus of leader L of seedling S (shown in phantom lines). It may be seen that opposite lateral edges of device 10 or 10' are affixed to one another by way of adherent strip 14. Importantly, because of the selective location in a lower region of device 10, 10', and because of the preferably trapezoidal or V-shape of an exposed adherent surface 14 thereof, an interior region of adhered device 10 or 10', assumes the shape of an inverted cone.

Figure 5A:
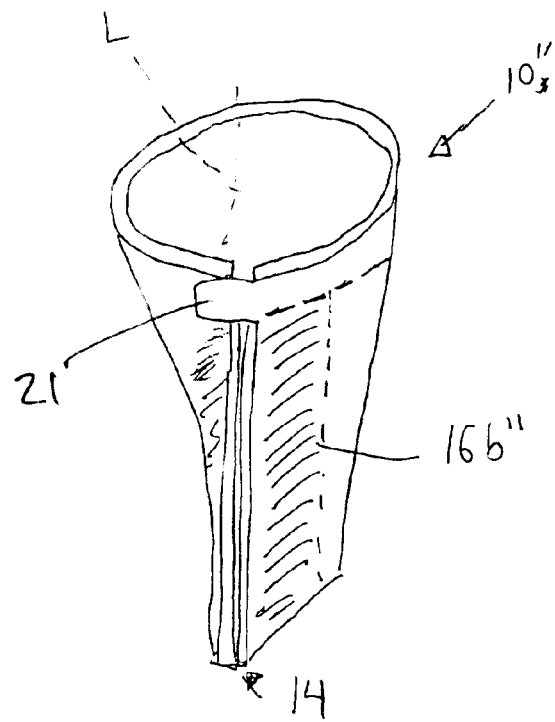
FIG. 5A shows a seedling bud with the invented bud capping device with a scent release pull-tab device affixed thereto in accordance with the third embodiment of the invention.

FIG. 5A shows bud capping device 10" deployed around the terminus of leader L of Seedling S (shown in phantom lines). The rectangular exposed adherent surface of 18" selectively adheres an interior region of adhered device 10", causing device 10" to assume the shape of an inverted cone and exposing a portion of the adherent surface to the environment.

The inverted cone shape in FIGS. 5 and 5A are very advantageous to protecting seedlings. As illustrated in both figures, sunlight is permitted into the base of the inverted cone, where there is relatively less adherence of opposing, pinched-together surfaces, thereby promoting photosynthesis and growth of the seedling. Also as illustrated, a secure grasp of the base of the seedling's stem (and typically some of its foliage) is assured because of the relatively wider adherence thereof near the base of the adherent surface.

Those of skill also will appreciate that capping device 10, 10' or 10" preferably is configured with selective adherent over a portion of its inside surface, as described and illustrated herein, to effectively grasp the stem of a leader, for example, and at least some of the needles that typically surround such stem, while also effectively permitting sunlight to enter the top of the device, also as described and illustrated. Consequently, it is within the spirit and scope of the invention to configure the adherent surface alternatively to the precise configurations described and illustrated herein. Finally, those of skill in the art will appreciate that similar paper stock-based structures may be provided for use at the base of other conifer seedlings, to protect such seedlings of somewhat different configuration.

It is contemplated as being within the spirit and scope of the invention to impregnate either the paper stock or the adherent strip with time-release animal repellents to further discourage animal browsing of seedlings. If the adherent strip is impregnated with the repellant then device 10" may be preferred as it enables exposed adherent to the environment. Those of skill in the art will appreciate that repellents and repellent scents are generally known, and can be straightforwardly intermixed with a paper stock slurry, the adhesive, or microencapsulated and affixed to the surface of the capping device 10, 10', or 10" easily and at low cost, to enhance the deterrent effect of seedling bud capping. By making the repellent preferably a slow-release formula, its effectiveness as a deterrent may be extended in time, perhaps for as long as weeks or months, to protect fragile seedlings until they are of sufficient height and/or breadth to outgrow the need for a bud cap.

Figure 6:
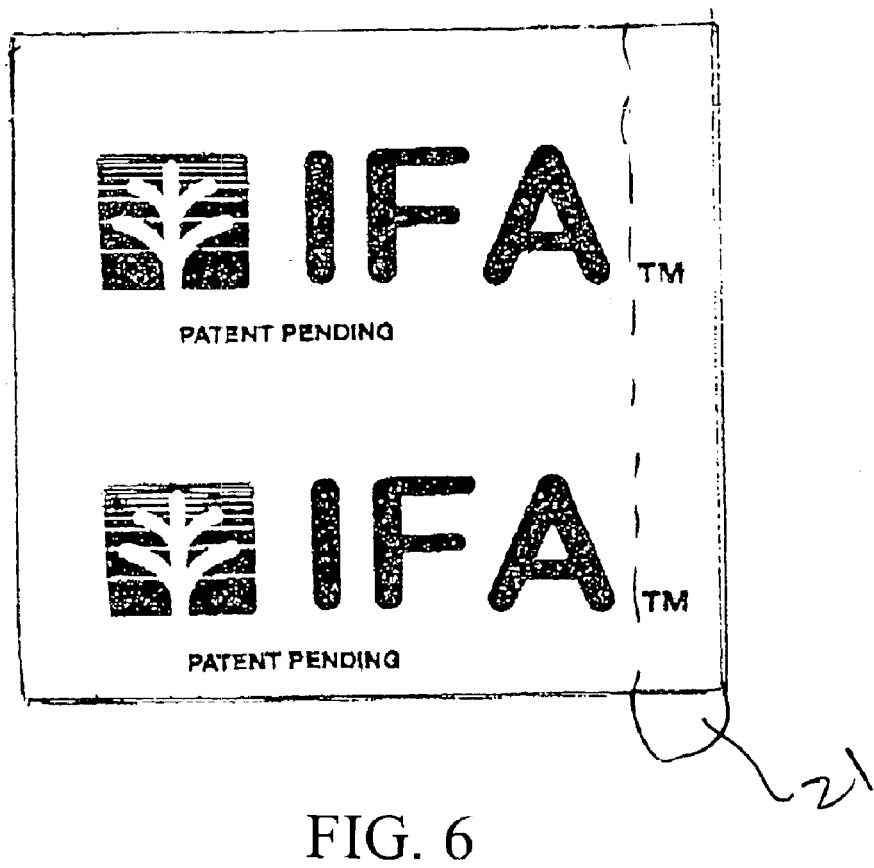
FIG. 6 is a top plan view of a scent release pull-tab device.

FIG. 6 shows a detail of scent-release pull-tab device 21. Pull-tab device 21 may be part of any embodiment of the bud capping device. The scent of the pull-tab device is microencapsulated into the pull-tab paper, or the device substrate, or both. Those of skill in the art will know the microencapsulation process, not described herein. The pull tab device 21 is torn partially along a perforation (indicated as a dashed line in FIGS. 4, 4A, 5A and 6) to expose the microencapsulated scented paper below thereby releasing the scent to the environment. The tabs are not fully removed, so as to avoid littering the environment.

It is contemplated as being within the spirit and scope of the invention to have multiple layers of the scent-release pull-tabs and layers on each side of the bud capping device (inside and outside of the cone). This would avoid the need to reapply a new cap each fall and spring for the first two years after planting the seedlings. Instead the planter can tear additional pull-tab devices on the original bud capping device at time intervals determined by the animal browsing rate at different times of the year and different locales. The pull tab may be in a horizontal or vertical position or both. If multiple pull tabs are present, only one pull tab—the vertical or the horizontal tab—need be torn to release the scent. It is expected that one pull tab will be torn as the tree planter plants the tree and the other will be torn at a later time to maximize time-release scent dispersal and to limit impact on the seedling.

FIG. 7 shows a third embodiment of the invention. In accordance with this third embodiment a bud-capping device 10" is similar in most respects to bud-capping device 10' but for the scent-release pull-tab device 21. Pull tab device 21 can be of any width, suitable material, or positioning on any embodiment of the bud capping device. The pull tab device 21 shown here covers the entire width of substrate 12. The scent of the pull-tab device is microencapsulated onto the pull-tab paper, or the device substrate, or both. Those of skill in the art will know the microencapsulation process not described herein. The pull tab device 21 is adhered to substrate 12 and pulled free to rupture the microencapsulated scent below thereby quickly releasing the scent to the environment. The tabs are not fully removed so as to avoid littering the environment, provide areas of protective covering slowing the release of scent capsules at that location, and increasing the effective height or width of bud capping device 10", as shown in FIG. 7B.

FIG. 7A shows pull tab 21 on bud capping device 10" deployed around the terminus of leader L of seedling S (shown in phantom lines). In this embodiment pull tab device 21 (shown by cross-hatched lines) covers the entire width of substrate 12 and extends beyond the bud capping device 10" so that it may easily be grasped, pulled and folded up and back on itself as indicated to deploy scent and increase the effective height of bud capping device 10".

FIG. 7B shows pull tab 21 on bud capping device 10" deployed around the terminus of leader L of seedling S (shown in phantom lines). In addition in this embodiment it shows pull tab device 21 (shown by cross-hatched lines) after its deployment increasing the effective height of the bud-capping device. Total height is controlled by a thin permanent glue line 22 at a predetermined line across substrate 12 to effectively stop upward movement of pull tab 21 as it is released. This additional deployment increases the time that the terminal bud can grow in height within the safety of the conic bud-capping device 10".

Figure 8A:
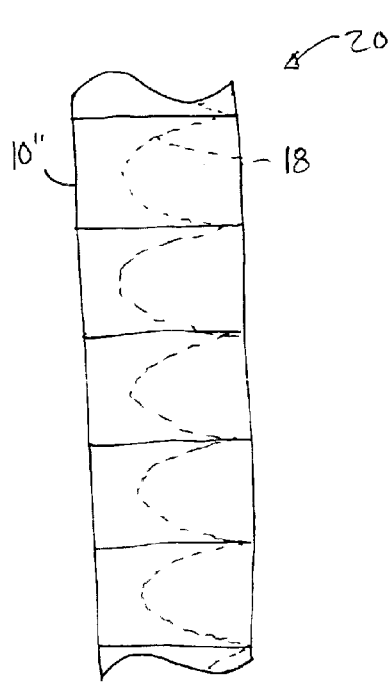
FIG. 8A is a top plan view of an elongate sheet or strip of plural bud capping devices in accordance with the third embodiment of the invention, with scent release pull-tab devices affixed thereto.

FIG. 8A shows another embodiment of the invention whereby an elongate sheet or strip 20 of plural devices 10" are manufactured at once and at relatively low cost. A long strip 20 of material is provided, in accordance with one embodiment of the invention, the long strip having a preferably regular one-dimensional array of plural bud capping devices 10" separable along score or perforation lines. The adherent strips 14 and the cover strips 16 are indicated in FIG. 7, along with the curved score lines 18 that permit deployment of devices 10 into the inverted conic shape shown in FIG. 5. Those of skill in the art will appreciate that all such score lines for device separation as well as for removal of the generally U-shaped cover region of protective cover layer 16 may be made preferably in a single die stamp operation.

Figure 8B:
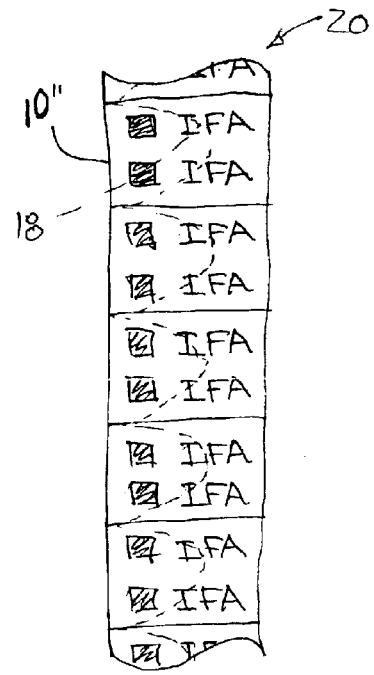
FIG. 8B is a bottom plan view of the strip of plural bud capping devices shown in FIG. 8A.

FIG. 8B is similar to FIG. 8A and for the sake of brevity will not be described in detail. Briefly stated, FIG. 8B shows the flipside of strip 20 formed and scored in a die stamp operation during their manufacture, and printed with plural arranged instances of a company logo. Those of skill in the art will appreciate that the reverse side of strip 20 (which may be of any color) may be printed, using known printing techniques, with one or more arrayed corporate logos, trademarks or trade names of the manufacturer of the individual seedling bud cap devices 10. (Refer, for example, to FIG. 8B, which shows such printing of the corporate tradename IFA™ and seedling DESIGN™ logo of the assignee of the present invention, IFA Nurseries, Inc. of Canby, Oreg.

Figure 9:
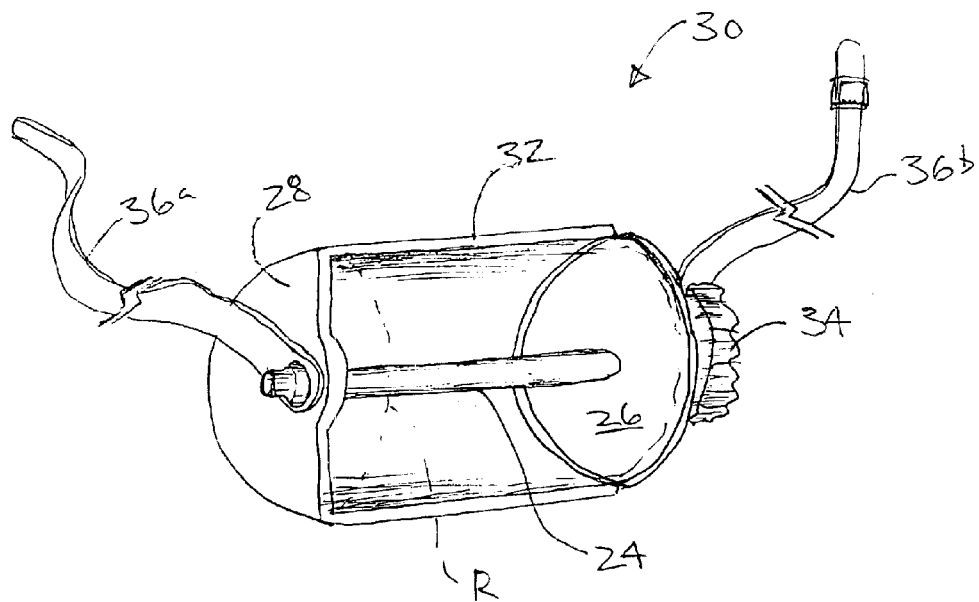
FIG. 9 is an isometric view of a bud capping device roll dispenser in accordance with another aspect of the invention.

Referring finally to FIG. 9, those of skill in the art will appreciate that the strip 20 shown in FIGS. 8A and 8B may in deployment assume the form of a roll R (shown only in phantom lines, for the sake of clarity), with individual bud capping devices 10" being serially dispensable therefrom. The roll as illustrated may be arranged for dispensing on a spindle 24 mounted on a circular disk 26 that forms part of a housing 28 of a dispenser 30 and extending through a keeper, e.g. a threaded nut or clasp, at an opposite end region of housing 28. Dispenser 30 preferably may have a semi-circumferentially extending cover 32 for partly protecting roll R. Dispenser 30 may provide a knurled knob 34 to aid dispensing of individual devices 10". Finally, dispenser 30 may be provided with a conventional adjustable shoulder strap 36a, 36b so that it may be deployed approximately waist-high on a user of the dispenser, as suggested.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A bud cap comprising:
   a substrate;
   a laminate;
   an adhesive between said substrate and said laminate;
   said laminate being scored for removal of a lower portion thereof during deployment of said bud cap around a seedling bud to expose said adhesive selectively along a lower portion of an inside surface of said bud cap.
   said removable portion of said laminate being configured to expose along said lower portion more adhesive along either lateral edge than is exposed in a central region of said bud cap.

2. The bud cap of claim 1, wherein said laminate is capable of being manually peeled away from a lower edge of said bud cap and folded over on itself, thereby extending the height of said deployed bud cap.

3. The bud cap of claim 1 which further comprises: A bud cap comprising;
   a substrate;
   a laminate;
   an adhesive between said substrate and said laminate;
   said laminate being scored for removal of a lower portion thereof during deployment of said bud cap around a seedling bud to expose said adhesive selectively along a lower portion of an inside surface of said bud cap; and
   an anti-browsing scent impregnated within said bud cap.

4. The bud cap of claim 3, wherein said scent is microencapsulated within said substrate.

5. The bud cap of claim 4, wherein said scent is released substantially only upon deployment of said bud cap by removal of said removable portion of said laminate.

6. The bud cap of claim 3, wherein said scent is impregnated within said adhesive.

7. A bud cap comprising:

a substrate;

a laminate; and an adhesive between said substrate and said laminate, said laminate being scored for removal of a lower portion thereof during deployment of said bud cap around a seedling bud to expose said adhesive selectivly along a lower portion of an inside surface of said bud cap, wherein said removable portion of said laminate is generally U-shaped to expose adhesive along a lower edge of said bud cap and to expose relatively more adhesive along either lateral edge than is exposed in a central region of said bud cap.

8. The bud cap of claim 7, wherein an outer surface of said bud cap when deployed is printed with supplier indicia.

9. A seedling bud cap apparatus comprising;

a roll of plural laminar sheets configured to form plural bud caps when deployed, each laminar sheet including a substrate and a cover adhered together, the cover being partially removable at a defined score line to expose an adhesive surface that when the cover is removed and the sheet is folded conforms the sheet into a sleeve that is the shape of a cone for inverted deployment around a top portion of a seedling bud, the plural laminar sheets being dispensable from said roll one at a time for such deployment.

10. The apparatus of claim 9, wherein each of said plural laminar sheets of said roll impregnated with an anti-browsing scent.

11. The apparatus of claim 9 which further comprises;

a dispenser including a spindle mounted to a disk for holding said roll of plural laminar sheets for dispensing the same one at a time.

12. A method of capping seedling buds, the method comprising;

providing a roll of plural laminar sheets configured to form plural bud caps when deployed.

each laminar sheet including a substrate and a cover adhered together, the cover being partially removable at a defined score line to expose an adhesive surface that when the cover is removed and the sheet is folded conforms the sheet into a sleeve that is the shape of a cone for inverted deployment around a top portion of a corresponding one of plural seedling buds; and dispensing the plural laminar sheets from the roll one at a time for such deployment.

* * * * *